US008004573B2

(12) United States Patent
Watanabe (10) Patent No.: US 8,004,573 B2
(45) Date of Patent: Aug. 23, 2011

(54) IMAGING APPARATUS, IMAGED PICTURE RECORDING METHOD, AND STORAGE MEDIUM STORING COMPUTER PROGRAM (75) Inventor: Kazuyoshi Watanabe, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 241 days.

(21) Appl. No.: 12/490,646

(22) Filed: Jun. 24, 2009

(65) Prior Publication Data
US 2009/0322906 A1    Dec. 31, 2009

(30) Foreign Application Priority Data

Jun. 26, 2008  (JP) ................................. 2008-167053

(51) Int. Cl.
*H04N 5/232* (2006.01)
*H04N 7/18* (2006.01)
*G06K 9/00* (2006.01)

(52) U.S. Cl. .................. 348/211.99; 348/152; 348/156; 382/115; 382/118

(58) Field of Classification Search ............. 348/211.99, 348/143–161; 382/115, 118
See application file for complete search history.

(56) References Cited

U.S. PATENT DOCUMENTS

| 7,711,190 B2 * | 5/2010 | Yamaguchi | 382/181 |
| 2006/0120604 A1 * | 6/2006 | Kim et al. | 382/181 |
| 2008/0025710 A1 | 1/2008 | Sugimoto | |
| 2008/0068466 A1 * | 3/2008 | Tamaru et al. | 348/208.99 |
| 2009/0256901 A1 * | 10/2009 | Mauchly et al. | 348/14.07 |

FOREIGN PATENT DOCUMENTS

| JP | 2006-005662 A | 1/2006 |
| JP | 2007-329602 A | 12/2007 |
| JP | 2008-054288 A | 3/2008 |

OTHER PUBLICATIONS

Japanese Office Action dated Oct. 6, 2009 and English translation thereof issued in a counterpart Japanese Application No. 2008-167053.

* cited by examiner

*Primary Examiner* — Tuan Ho
*Assistant Examiner* — Christopher K Peterson
(74) *Attorney, Agent, or Firm* — Holtz, Holtz, Goodman & Chick, PC (57) ABSTRACT

Upon an operation to full-press a shutter button being detected, a CPU detects human faces included in a picture imaged by an imaging unit, counts the number of the faces, and stores the number of the counted faces in a predetermined area of a memory unit. Thereafter, the CPU again detects faces included in an imaged picture and counts the number of the faces. When the number of the counted faces is equal to or smaller than the number of the faces stored in the predetermined area of the memory unit, the CPU repeats the process of detecting faces included in an imaged picture and counting the number of the faces. Meanwhile, when the number of the counted faces has increased from the number of the faces stored, the CPU records a picture that is to be imaged after a predetermined period of time passes in a recording medium.

6 Claims, 8 Drawing Sheets

IMAGING APPARATUS, IMAGED PICTURE RECORDING METHOD, AND STORAGE MEDIUM STORING COMPUTER PROGRAM

BACKGROUND OF THE INVENTION

1. Field of the Invention

The present invention relates to an imaging apparatus that images a picture, an imaged picture recording method, and a storage medium that stores a computer program.

2. Description of the Related Art

Unexamined Japanese Patent Application KOKAI Publication No. 2007-329602 proposes a camera that detects human faces from an imaged picture, counts the number of the faces, and records the picture in a recording medium such as a memory card in a case where the number of the faces is equal to a preset number of persons intended to be imaged.

Unexamined Japanese Patent Application KOKAI Publication No. 2007-329602 also proposes a camera that registers a plurality of faces in a face registration memory, counts the number of faces that are recognized as any of the registered faces from the faces included in an imaged picture, and records the picture in a recording medium such as a memory card in a case where the number of the recognized faces is equal to a preset number of persons intended to be imaged.

SUMMARY OP THE INVENTION

An object of the present invention is to provide an imaging apparatus that needs no setting of a number of persons intended to be imaged and records an imaged picture in response to a change in the number of imaged persons included in an imaging range, an imaged picture recording method, and a storage medium that stores a computer program.

To achieve the above object, an imaging apparatus according to the present invention includes: an imaging unit; a recording instruction detecting unit that detects an instruction to record a picture that is imaged by the imaging unit; a characteristic picture region detecting unit that detects a characteristic picture region included in a picture imaged by the imaging unit, the characteristic picture region containing a predetermined characteristic; an obtaining unit that makes the imaging unit image pictures continuously, and obtains a region number each time a picture is imaged, the region number indicating a number of characteristic picture regions that are detected by the characteristic picture region detecting unit; a determining unit that determines whether the region number obtained by the obtaining unit has changed or not; and a recording unit that records an imaged picture in a recording medium, in response to that the recording instruction detecting unit detects a recording instruction and when the determining unit determines that the region number has changed.

To achieve the above object, an imaged picture recording method according to the present invention includes: a recording instruction detecting step of detecting an instruction to record a picture that is imaged by an imaging unit; a characteristic picture region detecting step of detecting a characteristic picture region included in a picture imaged by the imaging unit, the characteristic picture region containing a predetermined characteristic; an obtaining step of making the imaging unit image pictures continuously, and obtaining a region number each time a picture is imaged, the region number indicating a number of characteristic picture regions detected at the characteristic picture region detecting step; a determining step of determining whether the region number obtained at the obtaining step has changed or not; and a recording step of recording an imaged picture in a recording medium, in response to that a recording instruction is detected at the recording instruction detecting step and when it is determined at the determining step that the region number has changed.

To achieve the above object, a storage medium according to the present invention stores a program that is readable by a computer possessed by an imaging apparatus and controls the computer to function as: a recording instruction detecting unit that detects an instruction to record a picture that is imaged by an imaging unit; a characteristic picture region detecting unit that detects a characteristic picture region included in a picture imaged by the imaging unit, the characteristic picture region containing a predetermined characteristic; an obtaining unit that makes the imaging unit image pictures continuously, and obtains a region number each time a picture is imaged, the region number indicating a number of characteristic picture regions detected by the characteristic picture region detecting unit; a determining unit that determines whether the region number obtained by the obtaining unit has changed or not; and a recording unit that records an imaged picture in a recording medium, in response to that the recording instruction detecting unit detects a recording instruction and when the determining unit determines that the region number has changed.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

First Embodiment

Figure 1:
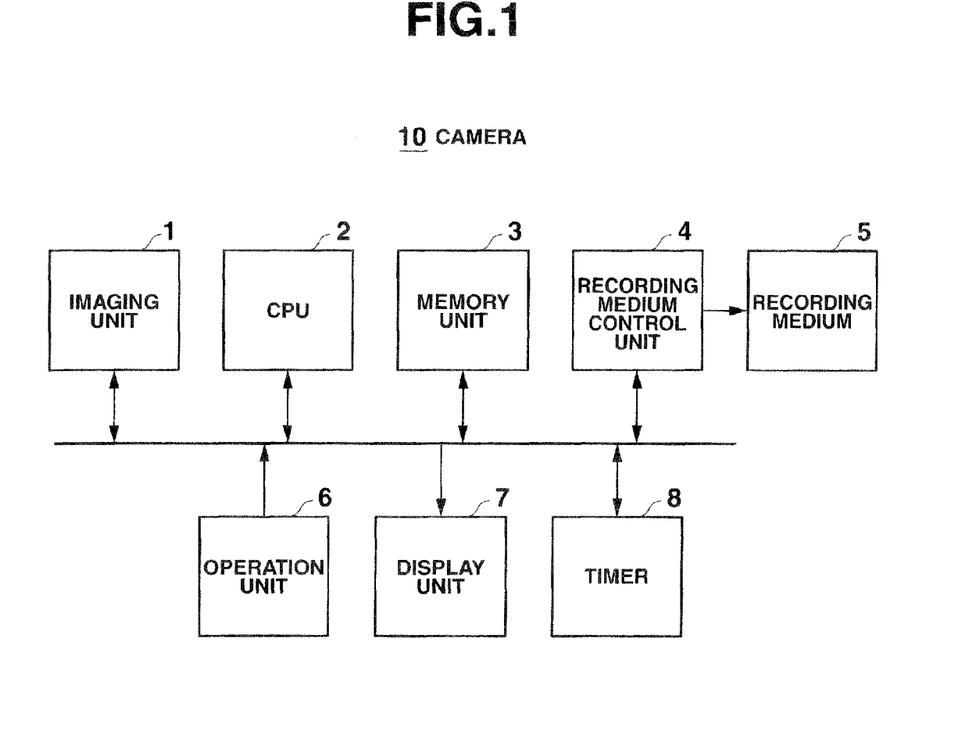
FIG. 1 is a block diagram of a camera according to an embodiment of the present invention.

As shown in FIG. 1, a camera 10 according to an embodiment of the present invention includes an imaging unit 1, a CPU (Central Processing Unit) 2, a memory unit 3, a recording medium control unit 4, a recording medium 5, an operation unit 6, a display unit 7, and a timer 8.

The imaging unit 1 includes an imaging device such as a CCD (Charge Coupled Device), a CMOS (Complementary Metal Oxide Semiconductor) image sensor, etc. The imaging unit 1 images pictures continuously. The imaging unit 1 converts an imaged picture from Analog to Digital (A/D), and outputs picture data, which is in the form of a digital signal, to the CPU 2.

The CPU 2 is a programmable processor. The CPU 2 controls the entire camera 10. The CPU 2 receives picture data output by the imaging unit 1, converts it into a format displayable by the display unit 7, and outputs it to the display unit 7 in the form of a through-the-lens image. When recording picture data, the CPU 2 applies various kinds of image processes and coding to the picture data, and outputs it to the recording medium control unit 4. The CPU 2 instructs the recording medium control unit 4 to record the picture data in the recording medium 5.

The memory unit 3 includes memories such as a RAM (Random Access Memory), a ROM (Read Only Memory), a flash memory, etc. The memory unit 3 stores programs of the CPU 2, various settings, etc. The memory unit 3 also temporarily stores data of an imaged picture.

The recording medium control unit 4 records picture data in the recording medium 5 in accordance with an instruction of the CPU 2. The recording medium 5 holds the data of the imaged picture recorded therein The recording medium 5 may be, for example, an SD (Secure Digital) memory card, a hard disk, a CD (Compact Disk), or a DVD (Digital Versatile Disk).

The operation unit 6 includes various operation keys and switches such as a shutter button and an up, down, left, and right cursor key.

The CPU 2 performs auto-focusing and automatic exposure upon detecting an operation to half-press the shutter button, for example.

Upon detecting an operation to full-press the shutter button, the CPU 2 immediately instructs the recording medium control unit 4 to record picture data in the recording medium 5. Further, upon detecting the operation to full-press the shutter button, the CPU 2 detects human faces (specifically, picture regions representing faces) from each imaged picture and obtains the number of the detected faces, as will be described later. When the number of faces increases, the CPU 2 instructs the recording medium control unit 4 after a predetermined period of time passes since the increase to record picture data in the recording medium 5.

The display unit 7 includes a display. The CPU 2 displays various messages and a through-the-lens image, which has been reduced in size as compared with the pictures imaged by the imaging unit 1, on the display. The size of the through-the-lens image is, for example, 320×240 pixels (QVGA). The user gives an operation to press the shutter button, etc., while checking the through-the-lens image on the display.

The timer 8 is a down-counter, for example. The timer 8 clocks time by counting down a preset predetermined period of time to pass, and upon counting down to 0, notifies the CPU 2 that the count has become 0 by giving the CPU 2 an interrupt.

Next, an overview of a process according to the first embodiment will be given. First, when there occurs, after an operation to full-press the shutter button is detected, an increase in the number of human faces included in continuously imaged pictures, the CPU 2 records picture data that is based on a picture imaged after a predetermined period of time passes since the increase, in the recording medium 5.

Figure 2:
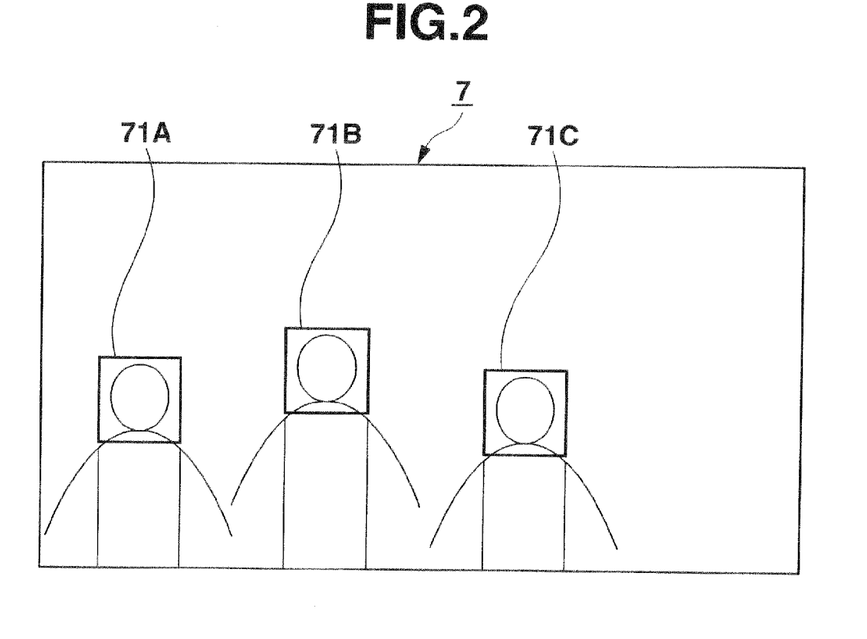
FIG. 2 is a diagram showing one example of a picture that is displayed on a display of a display unit.

Upon detecting that the shutter button is half-pressed, the CPU 2 detects human faces included in imaged pictures and obtains the number of the detected faces. The CPU 2 displays face frames 71 (71A to 71C) as shown in FIG. 2, by superimposing them on the through-the-lens image displayed on the display of the display unit 7.

Figure 3:
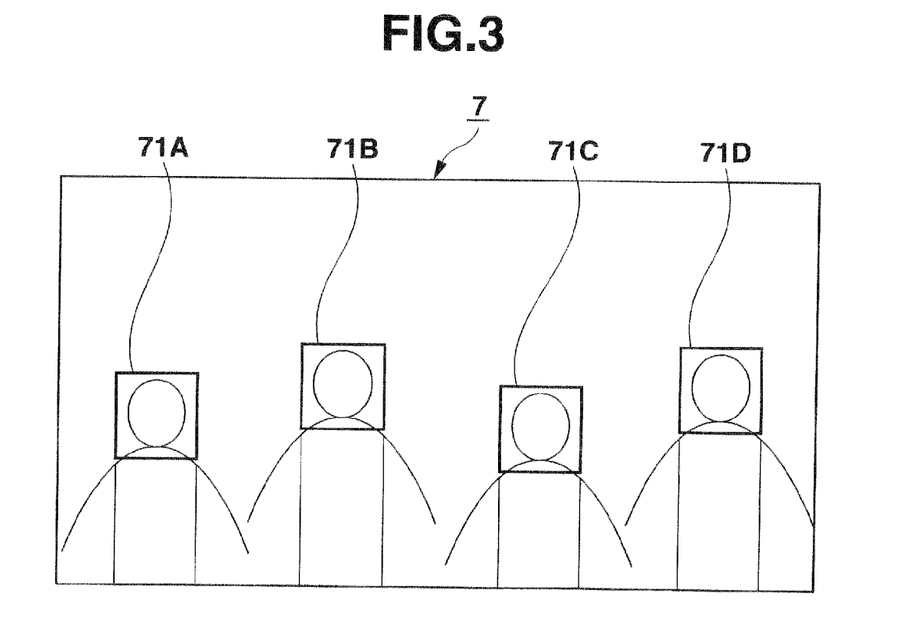
FIG. 3 is a diagram showing one example of a picture that includes one more human face than included in the picture of FIG. 2.

Then, when the shutter button is full-pressed, the CPU 2 again detects human faces from each continuously imaged picture and obtains the number of the detected faces. If the number of faces has increased, for example, from three to four and hence three face frames 71A to 71C have increased to four face frames 71A to 71D as shown in FIG. 3, the timer 8 starts counting down in order to clock a predetermined period of time. The CPU 2 records data of a picture that is imaged when the count of the timer 8 turns to 0 in the recording medium 5.

A specific process will be described in detail with reference to a main flowchart shown in FIG. 4. First, the CPU 2 makes initial settings such as setting a predetermined period of time in the timer 8 (step S101), and waits until an operation to half-press the shutter button is detected (step S102; No).

Upon detecting an operation to half-press the shutter button (step S102; Yes), the CPU 2 performs a face detecting process, which will be described later, and counts the number of the detected faces (step S103). Then, the CPU 2 performs auto-focusing and automatic exposure, targeting the detected faces (step S104).

At this time, as shown in FIG. 2, the CPU 2 displays face frames 71 (71A to 71C) on the through-the-lens image displayed on the display of the display unit 7, superimposing them on the detected faces. Under this state, the CPU 2 waits until an operation to full-press the shutter button is detected (step S105; No).

Upon detecting an operation to full-press the shutter button (step S105; Yes), the CPU 2 again performs the face detecting process and counts the number of the detected faces (step S106). Then, the CPU 2 stores the number of the faces counted in the face detecting process in a predetermined area of the memory unit 3 (step S107). Note that the CPU 2 may skip step S106 and store the number of the faces counted at step S103 in a predetermined area of the memory unit 3 at step S107.

After this, the CPU 2 performs the face detecting process on each new picture that is input from continuous imaging, and counts the number of the detected faces (step S108).

In a case where the number of the faces counted at step S108 is equal to or smaller than the number of the faces stored at step S107 (step S109; No), the CPU 2 returns to step S107 to store the number of the faces counted at step S108, and again performs step S108 to perform the face detecting process and count the number of the detected faces.

The CPU 2 compares the number of the faces counted at step S108 and the number of the faces stored at step S107, and if it is determined that the former has increased from the latter (step S109; Yes), the CPU 2 controls the timer 8 to start counting down the predetermined period of time. That is, among continuously imaged pictures, the CPU 2 compares a nearest previously imaged picture and a currently imaged picture as to the number of faces included therein. And in response to an increase in the number of the faces, the CPU 2 controls the timer 8 to start counting down.

Upon the count turning to 0, the timer 8 gives an interrupt to the CPU 2 to notify that the predetermined period of time has passed (step S110; Yes).

When the predetermined period of time has passed (step S110; Yes), the CPU 2 instructs the recording medium control unit 4 to record the picture that is imaged at this timing of passage in the recording medium 5 (step S111). The recording medium control unit 4 records the imaged picture in the recording medium 5.

Specifically speaking, the face detecting process at steps S103, S106, and S108 detects faces by using a face detector that has a function of distinguishing between picture regions representing faces and picture regions not representing faces.

The face detector can detect faces with accuracy sufficient for the purpose of the face detection of the present embodiment, even if the resolution is 320×240 pixels (QVGA) or so. Hence, in the present embodiment, the CPU 2 performs the face detecting process on the through-the-lens image.

Figure 5:
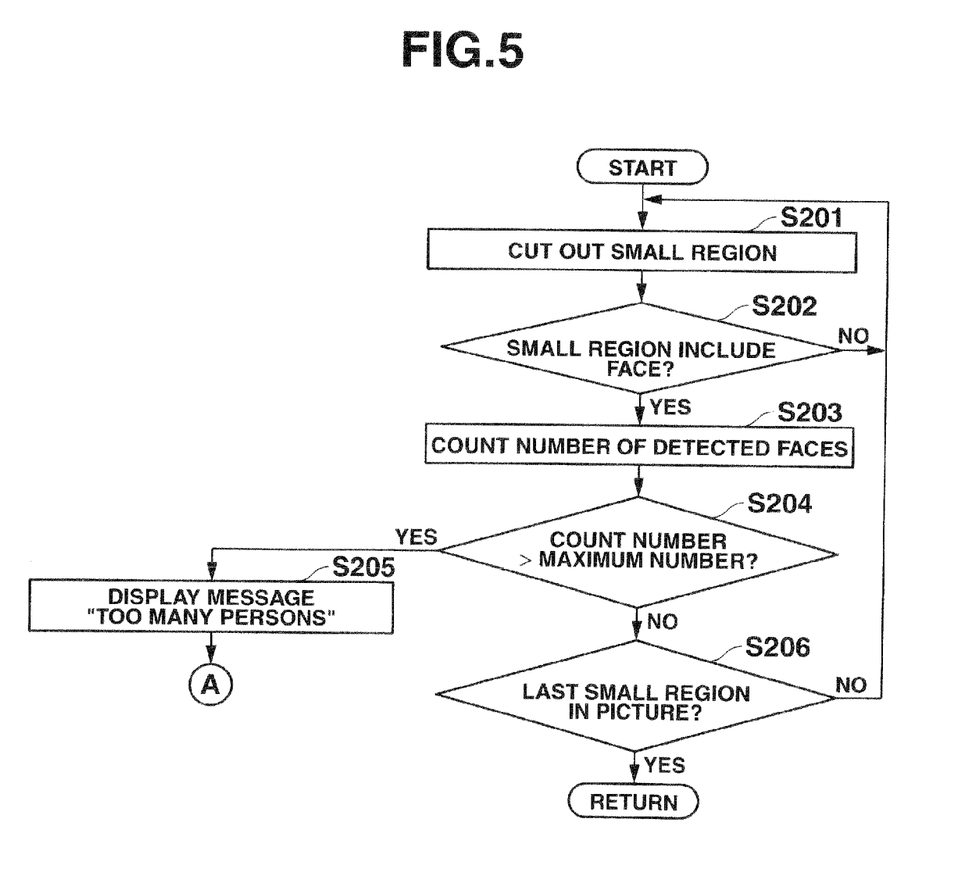
FIG. 5 is a diagram showing one example of a sub flowchart according to the first embodiment of the present invention.

FIG. 5 is a diagram showing one example of a sub flowchart of the face detecting process described above. As shown in FIG. 5, the CPU 2 cuts out a small region from the through-the-lens image (step S201), and determines by the face detector whether the small region includes a face or not (step S202). In order to detect a face that is captured in a large size or a face that is captured in a small size, the CPU 2 contracts or expand a small region to cut out a various-sized small region from the through-the-lens image and inputs the cut-out region to the face detector.

The face detector calculates a score that indicates face-likeness, based on a characteristic quantity that is obtained from the small region cut out from the through-the-lens image and a characteristic quantity that is retrieved from a face identification database stored in the ROM or the like. In a case where the score is larger than a preset threshold, the face detector determines that the small region cut out from the through-the-lens image includes a face.

Note that according to the present invention, the face detector is embodied as software that is executed by the CPU 2.

In a case where it is determined by the face detector that the small region does not include a face (step S202; No), the CPU 2 returns to step S201 and cuts out a next small region. On the other hand, in a case where it is determined by the face detector that the small region includes a face (step S202; Yes), the CPU 2 counts the number of detected faces (step S203).

In a case where it is determined that the number of the counted faces is larger than the maximum number of faces that are allowed to be detected from one picture (step S204; Yes), the CPU 2 displays a message that says, for example, that "there are too many persons", on the display of the display unit 7 (step S205), and terminates this process by jumping to after step S111 of FIG. 4.

On the other hand, in a case where it is determined that the number of the counted faces is not larger than the maximum number of faces that are allowed to be detected from one picture (step S204; No), the CPU 2 determines whether the current small region is the last one in the picture (step S206). In a case where it is determined that the small region is not the last one in the picture (step S206; No), the CPU 2 returns to step S201 and cuts out a next small region. When the determination by the face detector on the last small region in the picture is completed (step S206; Yes), the CPU 2 returns to the main flowchart.

Figure 6:
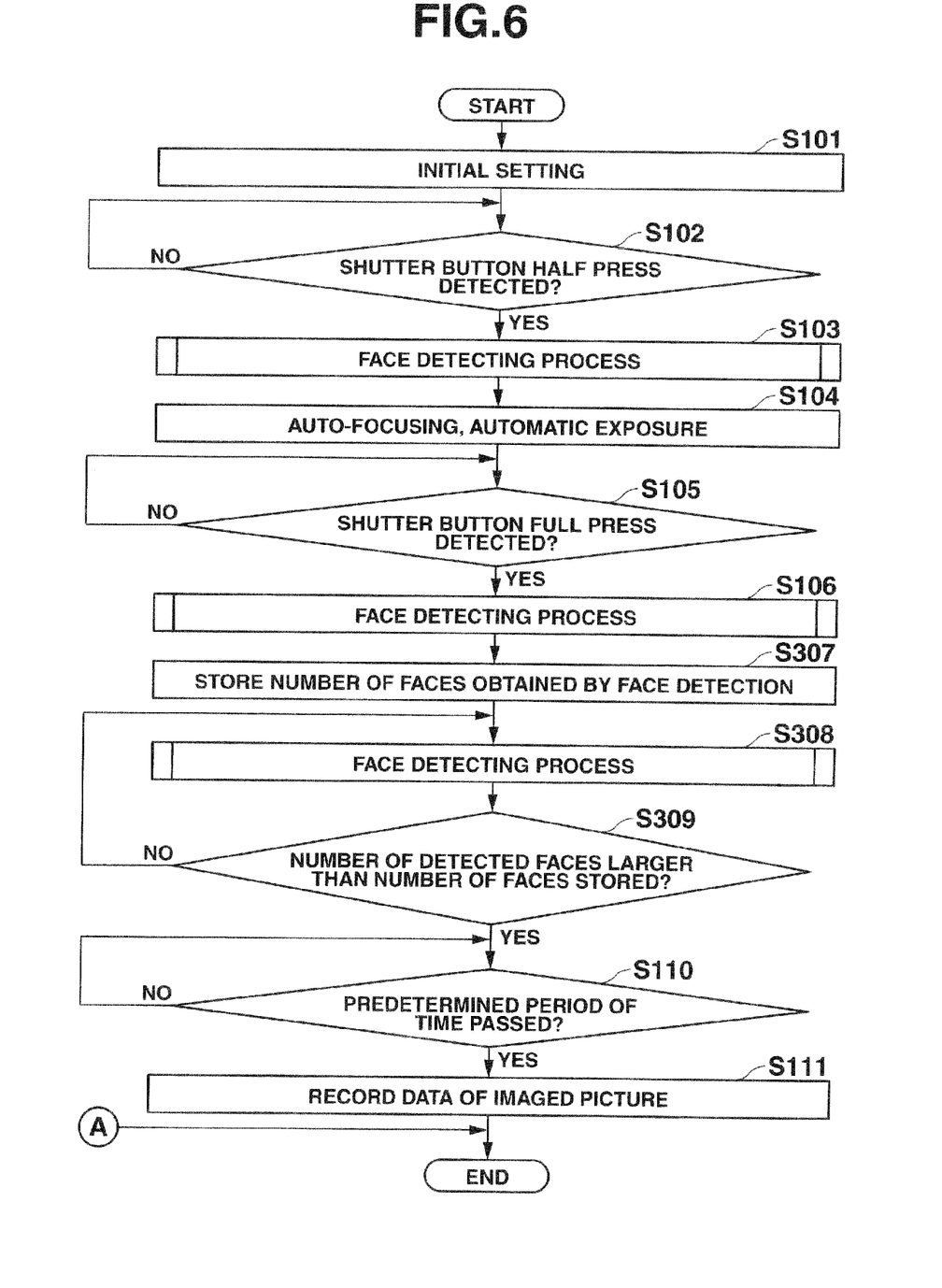
FIG. 6 is a diagram showing a main flowchart according to a modified example of the first embodiment of the present invention.

The first embodiment may be modified as follows. FIG. 6 is a diagram showing a modified example of the main flowchart shown in FIG. 4. Steps S101 to S106 and steps S110 and S111 are the same as those in FIG. 4.

Upon detecting an operation to full-press the shutter button (step S105; Yes), the CPU 2 performs the face detecting process and counts the number of the detected faces (step S106). The CPU 2 stores the number of the faces counted in the face detecting process in a predetermined area of the memory unit 3 (step S307). After this, the CPU 2 repeats the face detecting process for each picture and obtains the number of faces counted (step S308). In a case where the number of the faces counted at step S308 is equal to or smaller than the number of the faces stored at step S307 (step S309; No), the CPU 2 returns to step S308 to again perform the face detecting process and counts the number of faces detected.

In a case where it is determined that the number of the faces counted at step S308 is larger than the number of the faces stored at step S307 (step S309; Yes), the CPU 2 waits for a predetermined period of time to pass (step S110) and records data of the picture that is imaged at this timing of passage in the recording medium 5 (step S111).

Figure 4:
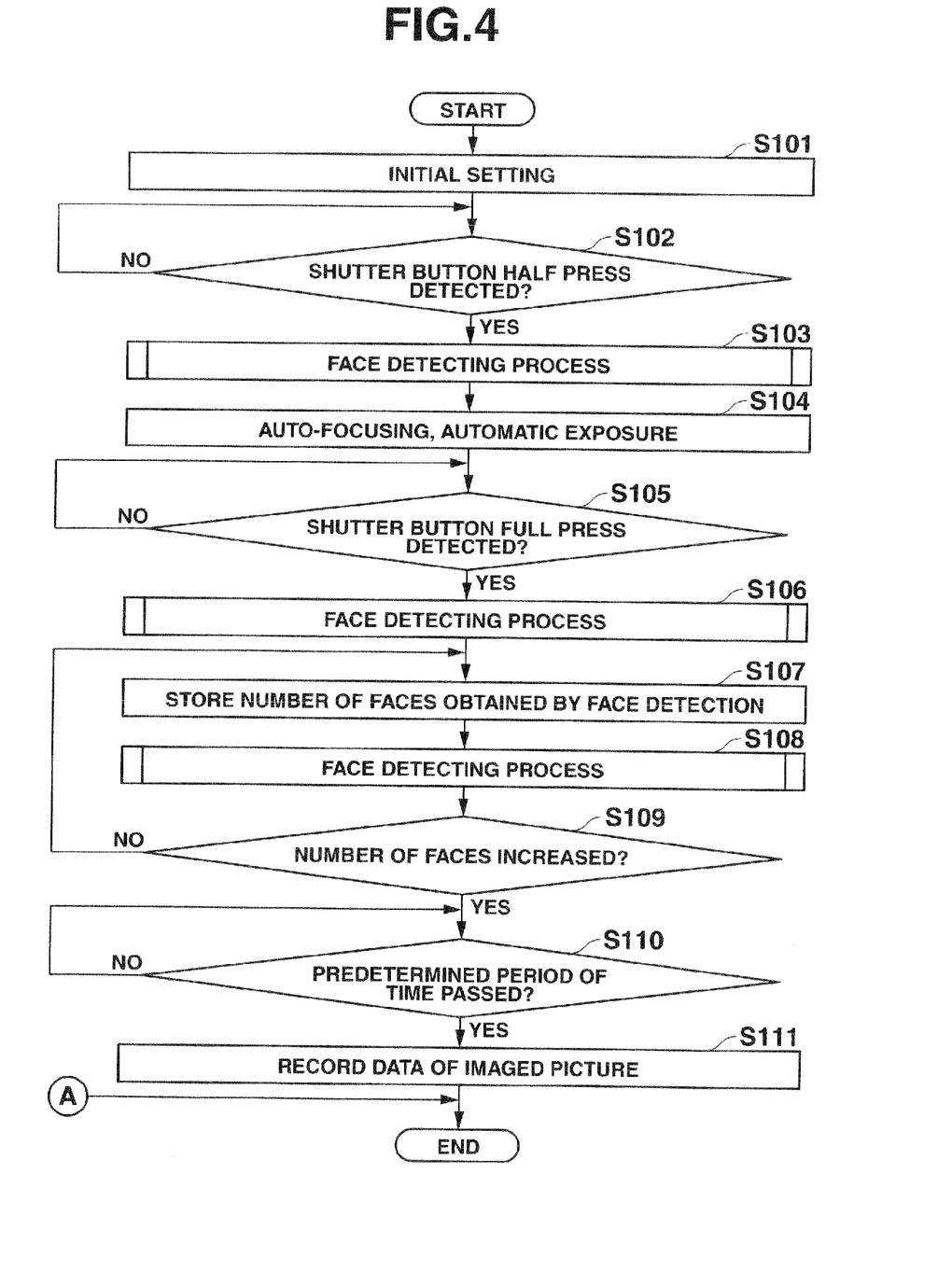
FIG. 4 is a diagram showing one example of a main flowchart according to a first embodiment of the present invention.

That is, in FIG. 4, the CPU 2 compares a nearest previously imaged picture and a currently imaged picture among continuously imaged pictures as to the number of faces included and records picture data in the recording medium 5 in response to an increase in the number of faces. As compared with this, in the modified example shown in FIG. 6, the CPU 2 compares a picture imaged when an operation to full-press the shutter button is detected and any picture imaged after the operation to full-press the shutter button is detected among continuously imaged pictures as to the number of faces included, and records picture data in the recording medium 5 in response to an increase in the number of faces.

Second Embodiment

In many cases, a group of persons, who are to have a group photo taken, turn their full face toward the camera or the like. In the second embodiment, when a group of persons take a group photo of theirs by setting a self-timer, a full face detector, which distinguishes between full faces that face the imager direction and faces that face other directions, detects full faces.

The second embodiment employs the camera 10 likewise the first embodiment.

Figure 7:
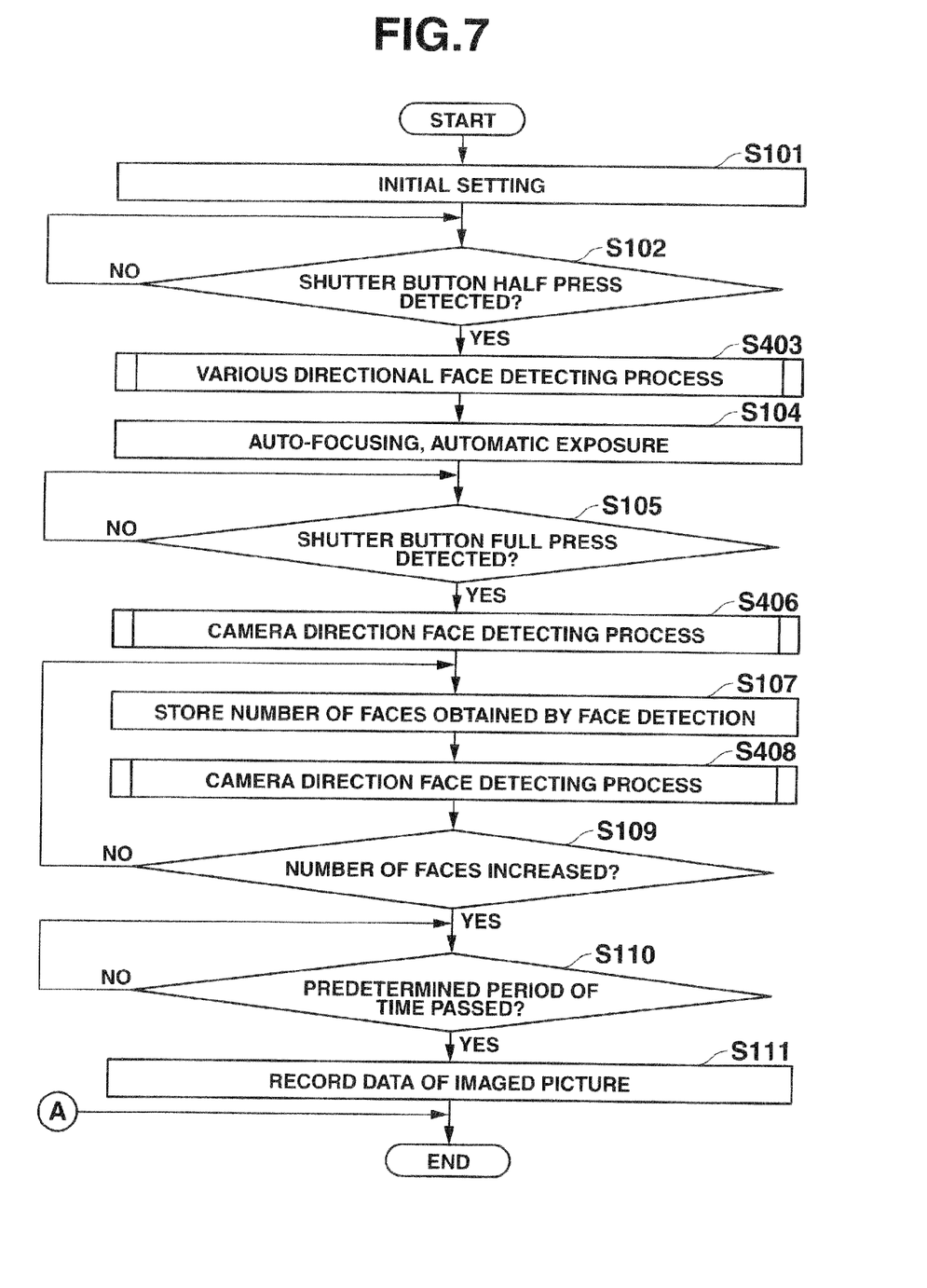
FIG. 7 is a diagram showing one example of a main flowchart according to a second embodiment of the present invention.

FIG. 7 is a diagram showing one example of a main flowchart according to the second embodiment of the present invention. FIG. 7 is different from FIG. 4 only in its face detecting process (steps S403, S406, and S408). The steps other than steps S403, S406, and S408 are the same as those of FIG. 4.

In response to an operation to half-press the shutter button being detected (step S102; Yes), the CPU 2 performs a face detecting process (step S403), and then performs auto-focusing and automatic exposure (step S104). At this time, the CPU 2 sets imaging conditions such as focus, camera exposure, exposure, etc. by targeting the faces detected in the face detecting process.

At this time, the imaged persons may not necessarily be facing the camera direction, but may be facing sideward or an oblique direction or tilting their faces. Hence, at step S403, the CPU 2 performs a face detecting process in many directions by using a first face detector, which is to be described later. The first face detector can detect not only a full face, but a half face, an oblique face, a tilted face, etc.

Meanwhile, when having a group photo taken, the group of persons are highly probably turning their full face toward the camera. Hence, upon detecting an operation to full-press the shutter button (step S105; Yes), the CPU 2 uses not the first face detector mentioned above but a second face detector that identifies a full face to perform a face detecting process in the camera direction and counts the number of the detected faces (step S406). The second face detector will be described later.

The CPU 2 stores the number of the faces counted in the face detecting process performed in the camera direction in a predetermined area of the memory unit 3 (step S107).

Then, each time a new picture is input from continuous imaging, the CPU 2 performs the face detecting process on the picture in the camera direction and counts the number of the detected faces (step S408).

After this, in a case where it is determined that the number of the faces counted at step S408 is equal to or smaller than the number of the faces stored at step S107 (step S109; No), the CPU 2 stores the number of the counted faces in the predetermined area of the memory unit 3 (step S107), and again performs step S408 to perform the face detecting process in the camera direction and count the number of the detected faces.

On the other hand, in a case where it is determined that the number of the faces counted at step S408 has increased from the number of the faces stored at step S107 (step S109; Yes), the CPU 2 waits for a predetermined period of time to pass (step S110) and records data of the picture that is imaged at this timing of passage in the recording medium 5 (step S111). That is, the CPU 2 compares a nearest previously imaged picture and a currently imaged picture among continuously imaged pictures as to the number of full faces included therein, and in response to an increase in the number of full faces, records picture data in the recording medium 5.

Next, the first face detector and the second face detector will be explained.

The face detector used at the above step S202 of FIG. 5 calculates a score that indicates face-likeness, based on a characteristic quantity obtained from a small region cut out from the through-the-lens image and a characteristic quantity retrieved from a face identification database stored in the ROM or the like. The face detector determines that the small region cut out from the through-the-lens image is a face, in a case where the score is larger than a preset threshold.

Setting this threshold high means making the face detecting condition stricter. Accordingly, setting the threshold high makes it more certain that a face-like object will be selected, and can increase the probability that a full face will be detected. Hence, with the threshold set high, the face detector used at step S202 of FIG. 5 can be the second face detector. In contrast, with the threshold set low, the face detector used at step S202 of FIG. 5 can be the first face detector.

Alternatively, the first face detector and the second face detector may be created separately with the use of the following technique.

Specifically, this technique is one of human face detecting methods that uses statistical pattern recognition. This method makes a face detector learn a face recognition rule by using many facial pictures and many non-facial pictures. For example, according to Adaboost learning, a face detector with a high recognition ability can be configured by combination of detectors with a relatively low recognition ability.

Hence, it is possible to create the second face detector suitable for full face detection, by making it learn a recognition rule by using many full-face pictures and various directional-face pictures (pictures representing a side face that faces sideward, pictures representing an oblique face that faces an oblique direction, pictures representing a tilted face, etc.). Further, it is possible to create the first face detector suitable for various directional face detection, by making it learn a recognition rule by using various directional-face pictures and many non-facial pictures.

Further, by using the first face detector as the face detector used at step S202 of FIG. 5, it is possible to perform the various directional face detecting process of step S403 in the sub flowchart of FIG. 5. Meanwhile, by using the second face detector as the face detector used at step S202 of FIG. 5, it is possible to perform the face detecting process in the camera direction of steps S406 and S408 in the sub flowchart of FIG. 5.

Figure 8:
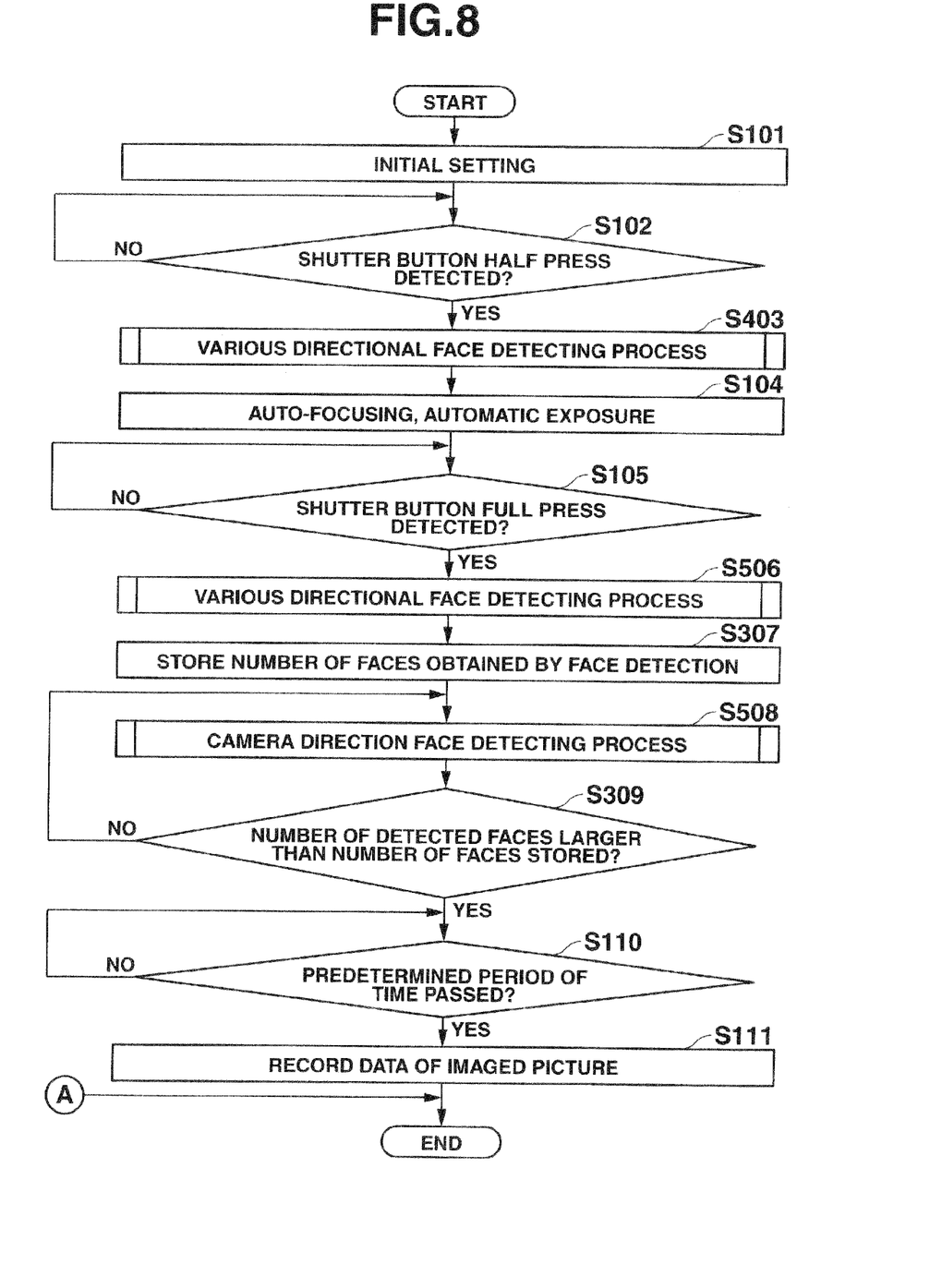
FIG. 8 is a diagram showing one example of a main flowchart according to a modified example of the second embodiment of the present invention.

The second embodiment may be modified as follows. FIG. 8 is a diagram showing a modified example of the second embodiment described above. FIG. 8 is different from FIG. 6 in its face detecting process (steps S403, S506, and S508). The steps other than steps S403, S506, and S508 are the same as those of FIG. 6.

Likewise in FIG. 7, in response to an operation to half-press the shutter button being detected (step S102; Yes), the CPU 2 performs the various directional face detecting process (step S403), and performs auto-focusing and automatic exposure targeting the detected faces (step S104).

However, even after an operation to full-press the shutter button is detected, the imaged persons might be facing sideward, upward, or downward. Hence, upon detecting an operation to full-press the shutter button (step S105; Yes), the CPU 2 performs the various directional face detecting process unlike in FIG. 7, and counts the number of the detected faces (step S506). The CPU 2 stores the number of the faces counted in the various directional face detecting process in a predetermined area of the memory unit 3 (step S307). Note that the CPU 2 may skip step S506 and store the number of the faces counted at step S403 in the predetermined area of the memory unit 3 at step S307.

The CPU 2 performs the face detecting process in the camera direction on each continuously imaged picture and counts the number of the detected lull faces (step S508). In a case where it is determined that the number of the full faces obtained at step S508 is equal to or smaller than the number of the faces stored at step S307 (step S309; No), the CPU 2 returns to step S508 to again perform the face detecting process in the camera direction and count the number of the detected full faces.

In a case where it is determined that the number of the full faces counted at step S508 is larger than the number of the faces stored at step S307 (step S309; Yes), the CPU 2 waits for a predetermined period of time to pass (step S110) and records data of the picture that is imaged at this timing of passage in the recording medium 5 (step S111).

That is, in the modified example shown in FIG. 8, the CPU 2 detects various directional faces when an operation to full-press the shutter button is detected, and counts the number of the detected faces and stores it in the predetermined area of the memory unit 3. Then, in response to that the number of full faces included in a currently imaged picture is larger than the number of the faces stored, the CPU 2 records data of an imaged picture in the recording medium 5.

The first face detector detects not only full faces but half faces, oblique faces, etc., while the second face detector detects only full faces. Therefore, firstly detecting the number of faces using the first face detector and then switching to the second face detector to detect the number of full faces may result in a reduction of the number of detected faces.

The CPU 2 compares the number of faces included in a picture that is imaged when an operation to full-press the shutter button is detected with the number of full faces that is obtained from each picture that is imaged continuously thereafter. Therefore, it is possible to prevent picture data from being recorded (step S111) in response to that, for example, a person who faced sideward in a picture that was imaged when an operation to full-press the shutter button was detected (step S105) has turned to face the camera direction.

When setting imaging conditions such as focus, camera exposure, exposure, etc., it is necessary that faces can be detected regardless of the directions of the faces and the expressions on the faces. Meanwhile, after imaging conditions are set, it is desired that persons who face the camera direction be imaged, if a group photo of the persons is to be imaged.

The second embodiment can satisfy these conflicting needs by detecting faces regardless of whether the faces face the camera direction or not when setting imaging conditions while determining whether the faces face the camera direction or not when imaging the faces.

Third Embodiment

The third embodiment employs face recognition for recognizing a particular person's face, instead of face detection. The CPU 2 records an imaged picture when there is an increase in the number of faces of particular persons that are included in imaged pictures.

The third embodiment employs the camera 10 likewise the first embodiment.

The CPU 2 preliminarily images faces of persons, who are the target of recognition, and extracts the characteristics of the faces. The CPU 2 registers the extracted characteristics of the faces of the recognition-target persons in a predetermined registration area of the memory unit 3. Note that characteristics of faces of a plurality of persons can be registered in the registration area.

Figure 9:
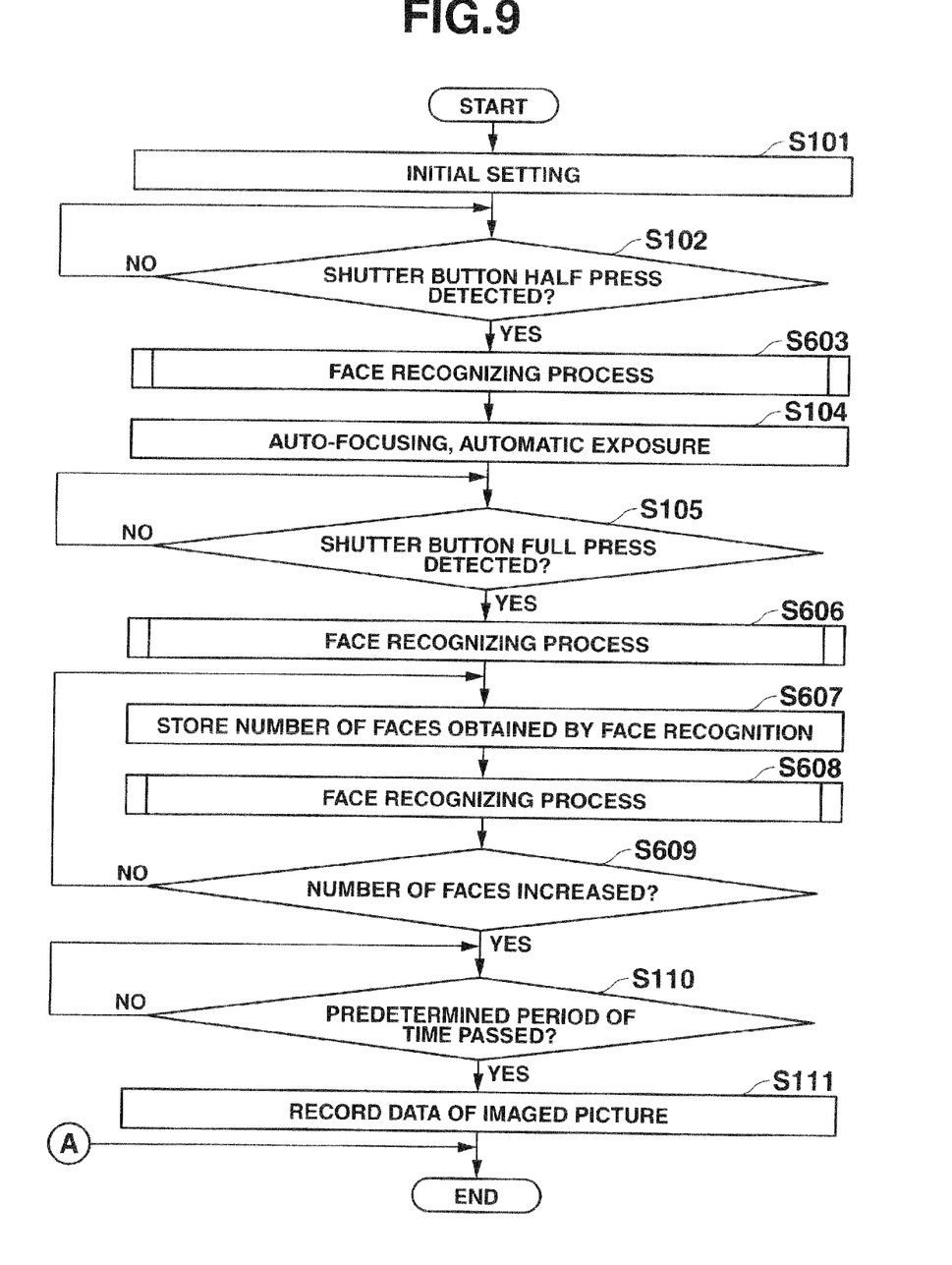
FIG. 9 is a diagram showing one example of a main flowchart according to a third embodiment of the present invention.

FIG. 9 is a diagram showing one example of a main flowchart according to the third embodiment of the present invention.

As shown in the main flowchart of FIG. 9, in response to an operation to half-press the shutter button being detected (step S102; Yes), the CPU 2 recognizes the face of any recognition-target person included in continuously imaged pictures, and counts the number of the recognized faces (step S603). Then, the CPU 2 performs auto-focusing and automatic exposure targeting the recognized faces (step S104).

Next, in response to an operation to full-press the shutter button being detected (step S105; Yes), the CPU 2 recognizes the face of any recognition-target person included in continuously imaged pictures and counts the number of the recognized faces (step S606), and stores the number of the counted faces in a predetermined area of the memory unit 3 (step S607). Note that the CPU 2 may skip step S606 and store the number of the faces counted at step S603 in the predetermined area of the memory unit 3.

Then, the CPU 2 recognizes the face of any recognition-target person from each picture still further continuously imaged, and counts the number of the recognized faces (step S608). In a case where the number of the counted faces is equal to or smaller than the number of the faces stored at step S607 (step S609; No), the CPU 2 returns to step S607 to store the number of the counted faces in the predetermined area of the memory 3 and again recognize the face of any recognition-target person from continuously imaged pictures and count the number of the recognized faces (step S608).

The CPU 2 compares the number of the faces stored at step S607 and the number of faces currently counted, and in response to that the latter has increased from the former (step S609; Yes), controls the timer 8 to start counting down a predetermined period of time (step S110).

It is possible to realize the face recognition of steps S603, S606, and S608 in the flow of FIG. 5, by replacing step S202 with a process for determining whether or not a small region includes the face of any recognition-target person that is registered in the memory unit 3.

The process of FIG. 9 is the same as the process of FIG. 4 except in recognizing the face of any recognition-target person and counting the number of the recognized faces (steps S603, S606, and S608).

Needless to say, the process of FIG. 9 may be made the same as the modified process of FIG. 6 except in recognizing the face of any recognition-target person and obtaining the number of the recognized faces.

In the third embodiment, CPU 2 records a picture that is imaged when the persons whose facial characteristic is registered come into the imaging range. Hence, it is possible to prevent a picture from being recorded in response to any unspecified person whose facial characteristic is not registered coming into the imaging range, which may be the case when pictures are taken in a crowd such as a tourist spot, an amusement park, etc.

The first embodiment described above detects human face pictures from each imaged picture and records a picture in response to that the number of human face pictures has increased, while it is possible that a picture be recorded in response to that faces have disappeared.

In this case, the CPU 2 records a picture that includes no human face in the recording medium 5. Hence, it is possible to prevent any indifferent person from being imaged when taking photos of scenery or constructions.

As explained above, the present invention requires no setting of a number of persons intended to be imaged, and can record a picture that is imaged in response to that the number of imaged persons included in the imaging range has changed.

That is, when taking a group photo that should include the camera operator, the present invention requires no preliminary setting of the number of persons intended to be imaged, but records a picture in response to that the camera operator has come into the imaging range. Hence, the present invention can image a group photo that includes the camera operator, by not requiring him/her to be nervous about timing but allowing him/her leeway.

The second embodiment detects full faces by using the second face detector that is suitable for detecting full faces. Hence, a group photo, in which all the imaged persons face the camera direction, can be imaged more securely than in a case where the second face detector that also detects half faces, oblique faces, etc. is used.

Though embodiments of the present invention have been described, it should be understood that various corrections or combinations thereof that may become necessary from any design requirement or any other factor are included in the scope of the invention set forth in the claims and of the invention that corresponds to the specific examples described in the embodiments.

A program for realizing the functions of the present invention may be stored in a storage medium to be distributed, or may be supplied via a network.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2008-167053 filed on Jun. 26, 2008 and including specification, claims, drawings and summary. The disclosure of the above Japanese Patent Application is incorporated herein by reference in its entirety.

What is claimed is:

1. An imaging apparatus comprising:
an imaging unit configured to capture images continuously;
a face detection unit configured to detect a face in each of the images captured by the imaging unit;
a first face detection control unit configured to set a first detecting condition for the face detection unit to thereby control the face detection unit to detect faces facing in various directions in the images continuously captured by the imaging unit;
an imaging condition setting unit configured to, when a face is detected by control executed by the first face detection control unit, set an imaging condition suitable for the detected face;
a recording instruction detecting unit configured to detect a recording instruction after the imaging condition setting unit sets the imaging condition;
a second face detection control unit configured to, after the recording instruction is detected by the recording instruction detecting unit, set for the face detection unit a second detecting condition, which is more limiting than the first detecting condition, to thereby control the face detection unit to detect a forward-facing face, which does not include any faces facing in other directions, in the images continuously captured by the imaging unit;
a face number obtaining unit configured to count a number of forward-facing faces that were detected by control executed by the second face detection control unit, for each of the continuously captured images;
a change determination unit configured to determine whether or not the number of the forward-facing faces that were counted by the face number obtaining unit in one of the continuously captured images is different as compared to an image captured just prior to the one of the continuously captured images; and
a recording unit that, in response to detection of the recording instruction, and in response to the determination of the change determination unit, saves in a recording medium an image representing the forward-facing faces, captured after the change determination unit determines that the number of forward-facing faces is different.

2. The imaging device according to claim 1, wherein the change determination unit determines whether the number of forward-facing faces counted by the face number obtaining unit in the one of the continuously captured image has increased as compared to the image captured just prior to the one of the continuously captured images; and
wherein the recording unit, in response to the detection of the recording instruction, and in response to a determination that the number of forward-facing faces has increased, saves in the recording medium the image representing the forward-facing faces.

3. The imaging apparatus according to claim 1, further comprising:
a face number storing unit configured to, in response to the detection of the recording instruction by the recording instruction detecting unit, store the number of forward-facing faces counted by the face number obtaining unit;
wherein the change determination unit is configured to determine whether the number of forward-facing faces in the one of the continuously captured image is larger than the number of forward-facing faces stored in the face number storing unit; and
wherein the recording unit is configured to, in response to the determination by the change determination unit that the number of forward-facing faces has increased, save in the recording medium the image representing the forward-facing faces.

4. The imaging apparatus according to any one of claim 1, further comprising:
a clock unit that measures a predetermined time set in advance;
wherein the recording unit is configured to save the image representing the forward-facing faces in response to elapsing of the predetermined time measured by the clock unit after the determination of the change by the change determination unit.

5. An imaged picture recording method, comprising:
an imaging step of causing an imaging unit to continuously capture images;
a first face detection control step of setting a first detecting condition for a face detection unit to thereby control the face detection unit to detect faces facing in various directions in the images continuously captured in the imaging step;
an imaging condition setting step of, when a face is detected by control executed in the first face detection control step, setting an imaging condition suitable for the detected face;
a recording instruction detecting step of detecting a recording instruction after the imaging condition setting step sets the imaging condition;
a second face detection control step of, after the recording instruction is detected in the recording instruction detecting step, setting for the face detection unit a second detecting condition, which is more limiting than the first detecting condition, to thereby control the face detection unit to detect a forward-facing face, which does not include any faces facing in other directions, in the images continuously captured in the imaging step;
a face number obtaining step of obtaining a number of forward-facing faces that were detected by the control executed in the second face detection control step, for each of the continuously captured images;
a change determination step of determining whether or not the number of forward-facing faces counted in the face number obtaining step in one of the continuously captured images is different as compared to an image captured just prior to the one of the continuously captured images; and
a recording step of, in response to detection of the recording instruction, and in response to the determination in the change determination step, saving in a recording medium an image representing the forward-facing faces captured after it is determined in the change determination step, that the number of forward-facing faces is different.

6. A non-transitory computer-readable storage medium storing a program that is readable by a computer of an imaging apparatus to control the computer to function as elements including:
an imaging unit configured to capture images continuously;
a face detection unit configured to detect a face in each of the images captured by the imaging unit;
a first face detection control unit configured to set a first detecting condition for the face detection unit to thereby control the face detection unit to detect faces facing in various directions in the images continuously captured by the imaging unit;

an imaging condition setting unit configured to, when a face is detected by control executed by the first face detection control unit, set an imaging condition suitable for the detected face;

a recording instruction detecting unit configured to detect a recording instruction after the imaging condition setting unit sets the imaging condition;

a second face detection control unit configured to, after the recording instruction is detected by the recording instruction detecting unit, set for the face detection unit a second detecting condition, which is more limiting than the first detecting condition, to thereby control the face detection unit to detect a forward-facing face, which does not include any faces facing in other directions, in the images continuously captured by the imaging unit;

a face number obtaining unit configured to count a number of forward-facing faces that were detected by control executed by the second face detection control unit, for each of the continuously captured images;

a change determination unit configured to determine whether or not the number of the forward-facing faces that were counted by the face number obtaining unit in one of the continuously captured images is different as compared to an image captured just prior to the one of the continuously captured images; and a recording unit that, in response to detection of the recording instruction, and in response to the determination of the change determination unit, saves in a recording medium an image representing the forward-facing faces, captured after the change determination unit determines that the number of forward-facing faces is different.

* * * * *